United States Patent [19]

Cappe et al.

[11] Patent Number: 4,716,278

[45] Date of Patent: Dec. 29, 1987

[54] APPARATUS FOR WARMING UP AND STERILIZING BABIES BOTTLES

[75] Inventors: Alain Cappe, Quiberon; Claude Nabet, Montrouge, both of France

[73] Assignee: Thermababy, S.A., Auray, France

[21] Appl. No.: 872,578

[22] Filed: Jun. 10, 1986

[30] Foreign Application Priority Data

Jun. 10, 1985 [FR] France .............. 85 08745

[51] Int. Cl.⁴ .............................................. H05B 3/58
[52] U.S. Cl. ..................................... 219/521; 219/387
[58] Field of Search ............... 219/521, 385, 386, 387, 219/200, 201, 202, 439

[56] References Cited

U.S. PATENT DOCUMENTS

| | | | |
|---|---|---|---|
| 562,021 | 11/1925 | Ziola | 219/415 |
| 1,717,132 | 6/1929 | Weinmann | 219/521 |
| 1,762,171 | 6/1930 | Goldsmith | 219/521 |
| 1,806,004 | 5/1931 | Tavender | 219/433 |
| 1,946,220 | 2/1934 | Lotz | 219/440 |
| 1,994,206 | 3/1935 | Ziskin et al. | 219/274 |
| 2,277,605 | 3/1942 | Palitzsch | 219/439 |
| 2,480,337 | 8/1949 | Pearce | 219/488 |
| 2,500,241 | 3/1950 | Brown | 219/521 |
| 2,516,637 | 7/1950 | McCollum | 219/521 |
| 2,734,826 | 2/1956 | Stentz | 219/385 |
| 2,778,921 | 1/1957 | Jepson | 219/439 |
| 3,247,360 | 4/1966 | Ponder | 219/439 |

FOREIGN PATENT DOCUMENTS

| | | | |
|---|---|---|---|
| 192778 | 11/1957 | Austria | 219/439 |
| 907269 | 3/1946 | France | 219/521 |

Primary Examiner—E. A. Goldberg
Assistant Examiner—Teresa J. Walberg
Attorney, Agent, or Firm—Pollock, Vande Sande & Priddy

[57] ABSTRACT

An electrical apparatus for warming and sterilizing a baby's bottle includes an open container or well provided with a first electrical heating device controlled by a thermostat adapted to warm the bottle. A lid having a valve is hermetically fixed on the well by a rapid-fixing device to form a closed compartment for sterilizing the bottle. A second electrical heating device is provided to generate a temperature higher than 100° C. in the closed compartment. A shunting arrangement controls the second electrical heating device. A temperature limiter disconnects the second electrical heating device when sterilization has been accomplished.

7 Claims, 2 Drawing Figures

APPARATUS FOR WARMING UP AND STERILIZING BABIES BOTTLES

BACKGROUND OF THE INVENTION

The present invention relates to an apparatus for heating up babies' bottles and small jars of baby food. Such apparatus conventionally comprise an open container or well provided with an electrical heating device controlled by a thermostat adapted to warm up the bottles and small jars.

Sterilizers are also known, designed for that sole purpose, enabling several bottles (for example seven) to be sterilized at the same time. Such sterilizers require large quantities of bottles, take up room, represent an additional investment and, in fact, are not convenient to use. Many parents continue to sterilize the bottles individually in a saucepan of water.

SUMMARY OF THE INVENTION

It is an object of the present invention to improve a conventional electric bottle warmer so that it can serve also for sterilizing individual bottles.

To this end, the apparatus according to the present invention comprises:
 (a) a lid which is hermetically fixed on the well by rapid-fixing means, forming together a closed compartment for sterilizing a bottle,
 (b) a second electrical heating device adapted to enable a temperature higher than 100° C. to be attained in the closed compartment,
 (c) a means for controlling the second electrical heating device,
 (d) at least one valve on the lid,
 (e) a means for interrupting the second electrical heating device when sterilization is accomplished.

The first and second electrical heating devices are advantageously constituted by the same heating collar surrounding the well.

The means for controlling the second electrical heating device is advantageously a switch for shunting the thermostat controlling the first electrical heating device.

The means for interrupting the second heating device is advantageously a temperature limiter.

BRIEF DESCRIPTION OF THE DRAWINGS

The invention will be more readily understood on reading the following description with reference to the accompanying drawings, in which.

DESCRIPTION OF THE PREFERRED EMBODIMENTS

Figure 1:
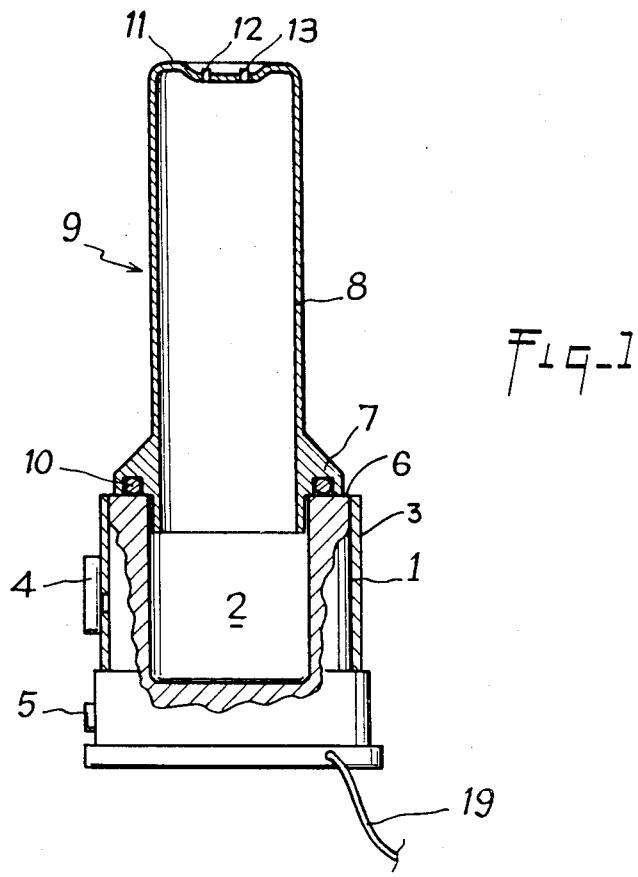
FIG. 1 is a side view in partial section of the structure of the apparatus according to the invention.

Referring now to the drawings, the apparatus of the present invention comprises a base 1 forming an open cylindrical container or well 2, surrounding by a heating collar 3 (cf. FIG. 2) embedded in the cylindrical wall of the base. Inside the base are also provided compartments protecting the electrical members of the apparatus, as well as the necessary heat- and electrical insulations. A knob 4 regulating the thermostat is provided on the front of the apparatus, as well as a lamp 5 indicating that the apparatus is working; an electrical power cord 19 is also provided.

The upper edge of well 2 forms a support ring 6 serving as stop for a flange 7 surrounding the cylindrical part 8 of the lid 9. Flange 7 comprises an annular housing enclosing an O-ring 10. Rapid-fixing means (not shown) join the lid 9 to the base 1, maintaining flange 7 in abutment on the support ring 6 so as to ensure seal.

The cylindrical part 8 of the lid penetrates, by its open end, slightly inside the well and is closed at its other end by a bottom 11 provided with two valves 12 and 13.

A basket-rack (not shown) is provided for positioning, and for supporting a bottle and its accessories (teats, etc . . . ) in the sterilization compartment.

Figure 2:
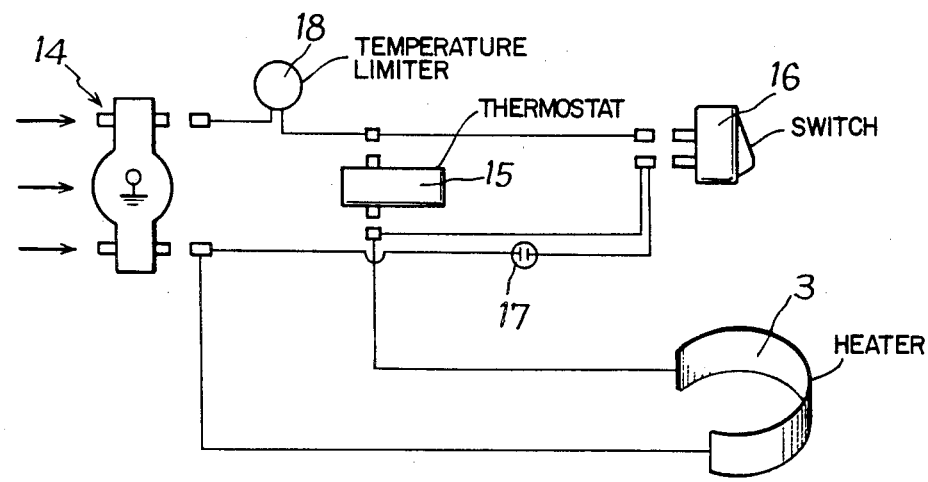
FIG. 2 shows the electrical circuit diagram thereof.

The electrical circuit diagram of the apparatus according to the invention is shown in FIG. 2).

When used for warming up, the heating collar 3 is supplied by supply 14 (220 V+earth) via the thermostat 15 with interruption, which limits the duration of operation as a function of the temperature selected. The thermostat is regulated so that, in position close to maximum, small jars of baby food can be warmed up.

To allow heating necessary for sterilization, a switch 16 makes it possible to supply the heating collar 3 by shunting thermostat 15, which would provoke too a rapid cut-off. Switch 16 may be located outside and independently controlled, or be controlled by a cam fixed to the knob 4 for regulating the thermostat, which would then be the sole control member. A neon lamp 17 indicates that the heating device is operating in sterilization mode.

A temperature limiter 18 is placed between the supply 14 and the heating collar 3 in order to interrupt operation once sterilization is accomplished, as will be explained hereinbelow.

The apparatus of the present invention operates as follows:

The apparatus, with its well 2 open, may be used in conventional manner for warming up small jars of baby food or babies' bottles, thanks to the thermostat which enables an appropriate temperature to be attained.

If it is desired to sterilize a bottle and its accessories, the basket-rack supporting the bottle and its accessories is mounted in the well 2 and the well is filled with a predetermined quantity of water. Well 2 is then covered with lid 9 which is fixed in hermetic manner.

Switch 16 is then commutated, this enabling the heating collar 3 to heat the water which rapidly (3 to 4 mins.) attains its boiling temperature. As the compartment in which the vapour is produced is closed, the pressure and temperature rise, the latter exceeding 100° C., which guarantees excellent sterilization.

The first valve 12 (for example a flap valve calibrated by a spring) makes it possible to limit overheating of the vapour and excessive rise in pressure of the system.

As the vapour escapes, the level of water decreases in the well 2. The limiter 18 is placed in the upper part of the well. When the water level lowers with respect to the heating collar, the temperature in the upper part of the well increases. As soon as the level has lowered sufficiently, the limiter 18 cuts off power supply of collar 3, which produces a delay time of operation as sterilizer. The predetermined quantity of water to be poured in the well at the beginning of the operation is calculated as a function of this objective, and may be reproduced thanks to a measure for pouring it and/or a mark in the well.

The second valve 13 is calibrated to open at a pressure level slightly higher than that of the first valve 12 and intervenes only as a safety measure in the event of the first valve 12 jamming.

The limiter 18 is manually reset in order to avoid untimely restarting of the apparatus. It also serves as a safety measure in the event of use without water, both in sterilizer and bottle-warmer mode.

What is claimed is:

1. An electrical apparatus for warming and sterilizing a baby's bottle, comprising:
    a base portion forming an open well provided with a first electrical heating device controlled by a thermostat and adapted to warm up the bottle,
    a lid adapted to be hermetically fixed on said base portion forming together with said well a tightly closed compartment, said compartment adapted to contain a bottle and to hold water, and having at least one valve communicating between the compartment and the exterior of said apparatus,
    a second electrical heating device for heating the water held in said closed compartment to a temperature higher than 100° C., and for sterilizing said bottle,
    means for controlling said second electrical heating device,
    means for disconnecting said second electrical heating device after sterilization has been accomplished.

2. The apparatus according to claim 1, wherein said first and second electrical heating devices are constituted by a single heating collar surrounding the well.

3. The apparatus according to claim 1, wherein said means for controlling the second electrical heating device is a switch for shunting the thermostat controlling the first electrical heating device.

4. The apparatus according to claim 1, wherein said means for disconnecting the second electrical heating device is a temperature limiter.

5. An electrical apparatus for warming and sterilizing a baby's bottle, comprising:
    a base portion forming an open well provided with a first electrical heating device controlled by a thermostat and adapted to warm up a bottle,
    a lid adapted to be hermetically fixed on said base portion forming together with said well a tightly closed compartment adapted for housing said bottle and holding water therein, said compartment having at least one valve communicating between the compartment and the exterior of said apparatus,
    a second electrical heating device adapted to heat the water held in said closed compartment to a temperature higher than 100° C., and for sterilizing said bottle,
    means for controlling said second electrical heating device,
    means for disconnecting said second electrical heating device after sterilization has been accomplished, wherein said first and second electrical heating devices are constituted by a common heating element and wherein said means for controlling said second electrical heating device is a switch for shunting said thermostat controlling said first electrical heating device.

6. The apparatus according to claim 5 wherein said common heating element is a heating collar surrounding said well.

7. An electrical apparatus for warming and sterilizing a baby's bottle, comprising:
    a base portion forming an open well provided with a first electrical heating device adapted to heat to a first and second predetermined temperatures,
    a lid adapted to be hermetically fixed on said base portion forming together with said well a tightly closed compartment, said compartment being adapted to house said bottle and to hold water therein and having at least one valve communicating between the compartment and the exterior of said apparatus,
    a thermostat controlling said electrical heating device adapted to interrupt the heating when the bottle has reached said first predetermined temperature,
    a switch for shunting said thermostat to allow heating the water held in said compartment to a second temperature higher than 100° C., and for sterilizing said bottle,
    means for disconnecting said heating device after sterilization has been accomplished.

* * * * *